United States Patent [19]
Mazzagatti

[11] 3,823,694
[45] July 16, 1974

[54] ROTARY PISTON ENGINE HAVING ALTERNATELY USED EXTERNAL COMBUSTION CHAMBERS

[76] Inventor: Concezio Mazzagatti, 3786 Santa Fe Ave., Buenos Aires, Argentina

[22] Filed: May 31, 1972

[21] Appl. No.: 258,292

[30] Foreign Application Priority Data
June 1, 1971  Argentina .......................... 235905

[52] U.S. Cl. ............................................. 123/8.27
[51] Int. Cl. ........................................... F02b 53/00
[58] Field of Search ....... 123/8.19, 8.27, 8.29, 8.31; 60/39.61, 39.62, 39.21; 418/142

[56] References Cited
UNITED STATES PATENTS
| | | | |
|---|---|---|---|
| 891,394 | 6/1908 | Benson | 123/8.27 |
| 939,751 | 11/1909 | Schulz | 60/39.61 X |
| 1,846,298 | 2/1932 | Alczhauer | 60/39.61 X |
| 2,180,352 | 11/1939 | Fahrney | 123/8.27 |
| 2,402,257 | 6/1946 | Rich | 123/8.27 |

Primary Examiner—Carlton R. Croyle
Assistant Examiner—Michael Koczo, Jr.
Attorney, Agent, or Firm—Milton Osheroff

[57] ABSTRACT

Rotary engine having a casing, a rotor housed therein and dividing said casing into a volume increasing chamber and a volume decreasing chamber, respectively connected to a fuel mixture inlet conduit and an exhaust gas outlet conduit, a pair of compressed fuel mixture receiving chambers outside said casing for producing the ignition of the compressed fuel mixture therein, and sending the expanding gases into said casing for driving said rotor, which in turn compresses the fuel mixture for sending it into said compressed fuel mixture receiving chambers and discharges the exhaust gases.

10 Claims, 17 Drawing Figures

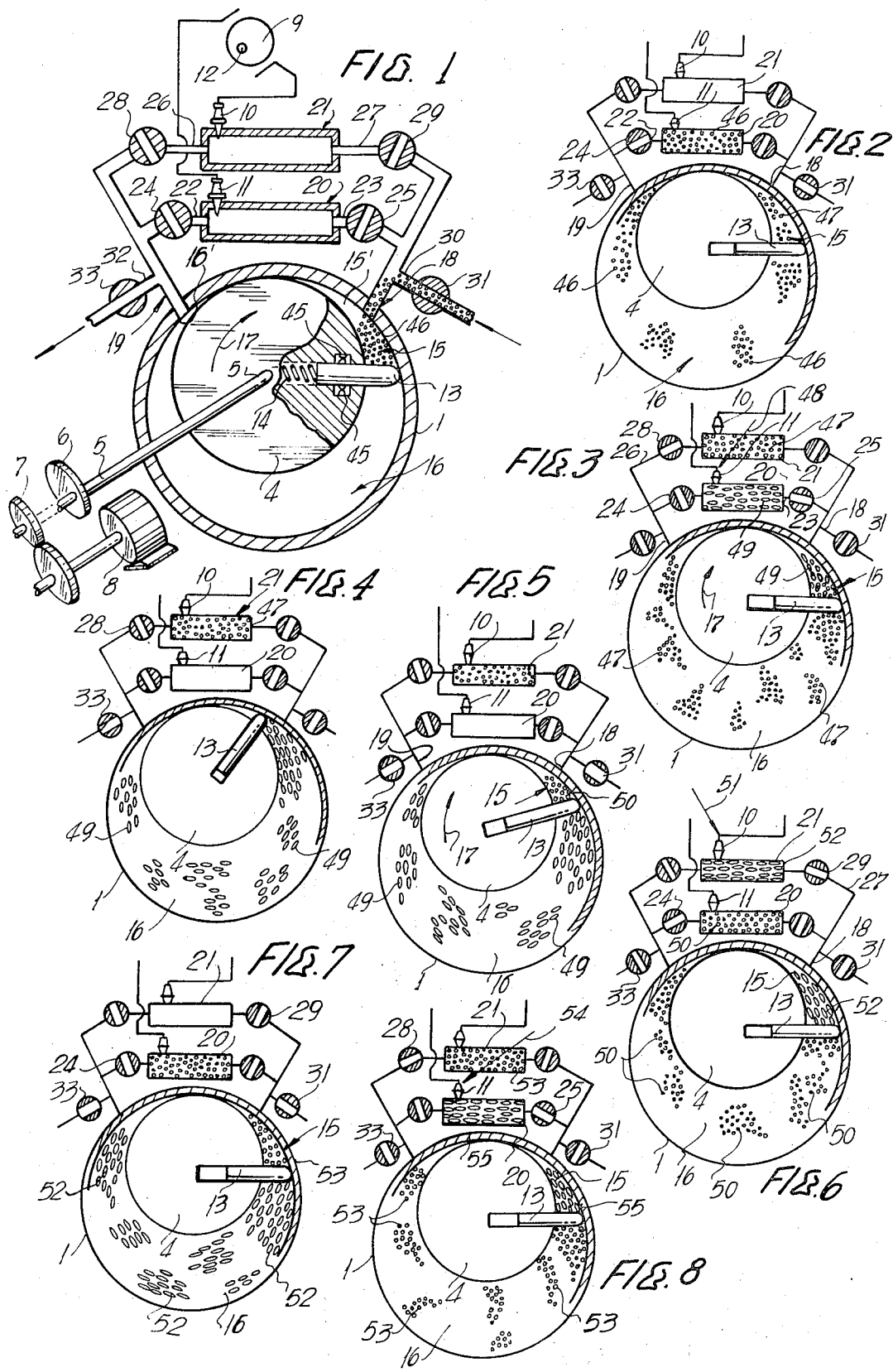

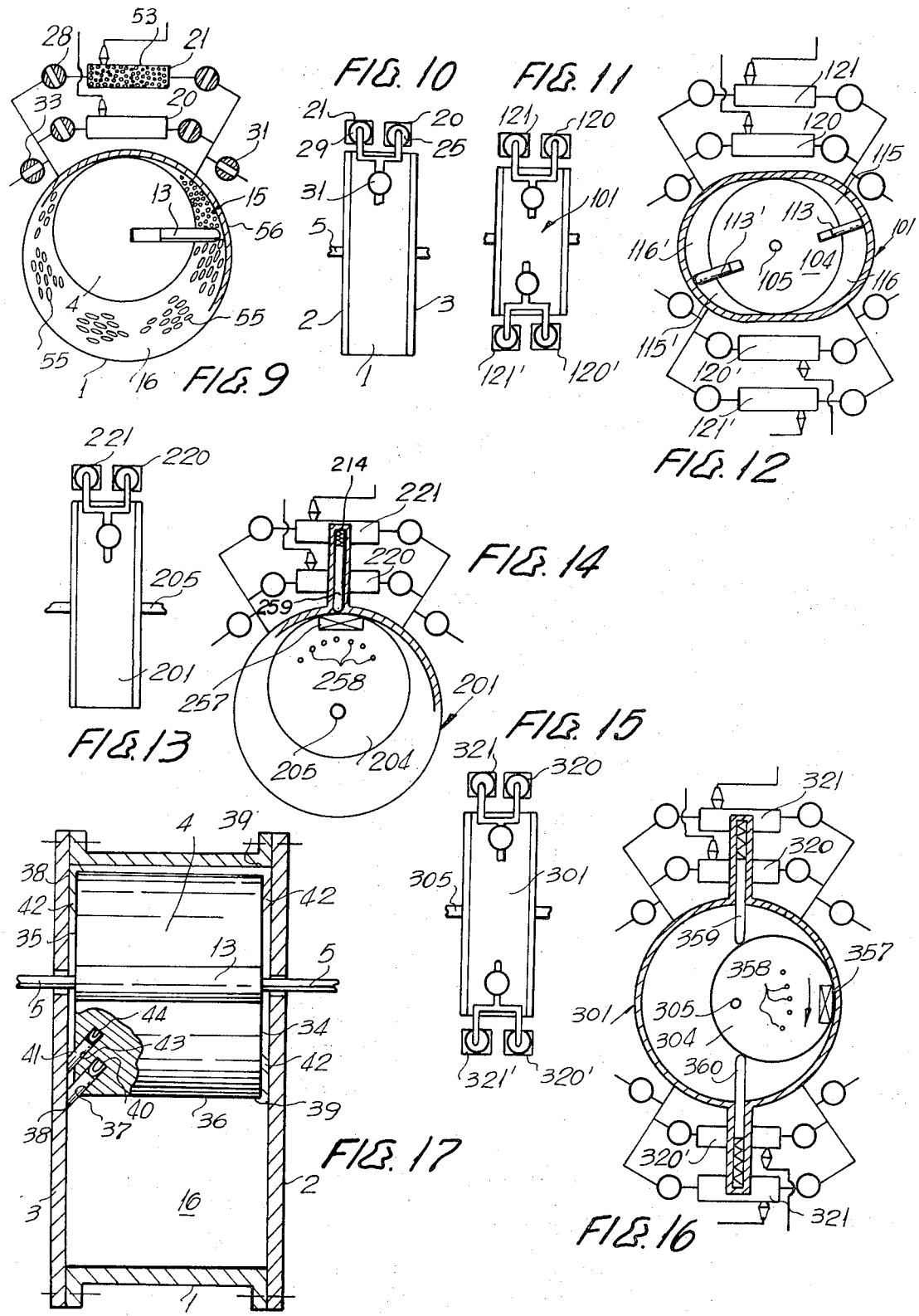

ROTARY PISTON ENGINE HAVING ALTERNATELY USED EXTERNAL COMBUSTION CHAMBERS

BACKGROUND OF THE INVENTION

1. Field of the Invention

The present invention refers to a rotary engine.

Modern tendency moves in the way of replacing the to and fro moving internal combustion piston engines by continuously rotating power generators to increase the efficiency, as is well known in the art.

2. Description of the Prior Art

Rotary internal combustion engines having a casing in which a rotor is housed and which rotor is in sliding and sealing contact with at least one portion of the stationary casing, thus defining a tangent plane, are well known. These rotros are provided with at least one resiliently urged, projecting blade or vane, the free tip of which is in sliding and sealing contact with the casing, thereby dividing the casing into a volume increasing chamber and a volume decreasing chamber. In some embodiments these vanes are resiliently supported by the casing and in sliding and sealing contact with the rotor. Fuel mixture is injected into the volume decreasing chamber and upon having reached a suitable state of compression is ignited and the expanding gases enter in the volume increasing chamber to thereby drive the rotor.

It has also been proposed, within that concept, to provide within the rotor chambers which receive the compressed fuel mixture and ignition of the fuel mixture takes place therein. The expanding gases are then transferred to the volume increasing chamber to drive the rotor.

In all these embodiments there is an outstanding sealing problem in order to correctly separate the volume increasing chamber from the volume decreasing chamber due to the fact that these embodiments operate at very high temperatures, because the ignition of the compressed fuel mixture takes place within the space defined by said casing.

SUMMARY OF THE INVENTION

According to the present invention, the rotary engine is provided with compressed fuel mixture receiving chambers arranged outside the space defined by the casing. The fuel mixture is compressed by the rotor in the casing and sent into the fuel mixture receiving chambers. Ignition takes place in said compressed fuel mixture receiving chamber. The expanding gases are then introduced into the casing to drive the rotor which in turn is adapted to compress a new fuel mixture to be sent in compressed state into one of said compressed fuel mixture receiving chambers.

An optimum cooling of the compressed fuel mixture receiving chambers and an optimum cooling of the casing is thereby possible, since these coolings can be independently handled. Thus, it is possible to provide different cooling means for the casing and the compressed fuel mixture receiving chambers, which provides a better engine output.

More particularly, the present invention relates to a rotary engine having a casing defining an enclosed space, a rotor of smaller volume than said space, said rotor being rotatably housed in said space, said rotor having a periphery which enters in contact at, at least one tangent plane with said casing, at least one sealing means in relationship with said rotor and casing, said sealing means dividing said space into at least one volume increasing chamber and one volume decreasing chamber, said engine is furthermore provided with at least two compressed fuel mixture receiving chambers outside said space, conduit means including controllable shut-off valves connecting said compressed fuel mixture receiving chambers to said volume increasing and decreasing chambers adjacent said tangent plane, a fuel mixture inlet conduit having controllable shut-off valve means and an exhaust gas outlet conduit having controllable shut-off valve means, said fuel mixture inlet conduit being connected to said volume increasing chamber adjacent said tangent plane, said exhaust gas outlet conduit being connected to said volume decreasing chamber adjacent said tangent plane, each compressed fuel mixture receiving chamber is provided with fuel ignition means, and timed control means connected to said ignition means and said valve means for exciting said ignition means and for opening and closing said valve means in timed relationship, respectively.

BRIEF DESCRIPTION OF THE DRAWINGS

In order to facilitate the interpretation of the present invention, reference will now be made by way of example to several structural embodiments in relationship to the accompanying drawings, wherein:

FIG. 1 is a schematical sectional front view showing the rotary engine in accordance with the present invention. FIG. 1 shows the moment of starting a new engine which has not been used previously and will be used for explaining the embodiment in relationship with the first turn during the start of the engine.

FIGS. 2 to 9 are showing the same engine as in FIG. 1, but still in a more schematical way and more particularly:

FIG. 2 shows the position of the second turn during the start.

FIG. 3 shows the position of the third turn during the start.

FIG. 4 shows the position at the beginning of the fourth turn during the start.

FIG. 5 corresponds to the same fourth turn during the start but in a position where the rotor and its sealing means are in a more forward moved position with regard to that shown in FIG. 4.

FIG. 6 corresponds to the fifth turn which in turn corresponds to the first turn once the engine is operating under normal run.

FIG. 7 is the sixth turn and corresponds to the second turn of the engine under normal run.

FIG. 8 is a seventh turn and corresponds to the third turn of the engine under normal run.

FIG. 9 is the eighth turn and corresponds to the fourth turn of the engine under normal run.

FIG. 10 is a schematical side elevation of the engine corresponding to FIGS. 1 to 9.

FIG. 11 is a schematical side elevation of another structural embodiment which is a first alternative embodiment with regard to the engine shown in FIGS. 1 to 10.

FIG. 12 is a schematical sectional front view of the engine shown in FIG. 11.

FIG. 13 is a schematical side view of another structural embodiment defining a second alternative embodiment with regard to the engine of the present invention.

FIG. 14 is a schematical sectional front view of the engine corresponding to FIG. 13.

FIG. 15 is a schematical side view of another structural embodiment defining a third alternative with regard to the engine of the present invention.

FIG. 16 is a schematical sectional front view of the engine corresponding to FIG. 15.

FIG. 17 is a schematical side elevation, partially in section, of the engine of FIG. 1 and showing additional sealing means which are provided in the rotor.

DESCRIPTION OF THE PREFERRED EMBODIMENTS

The structural details of the invention will be described in first instance with regard to the embodiment of the engine as shown in FIGS. 1 to 10 to thereafter explain the principle of operation, which principle will be explained in relationship to FIGS. 1 to 10 and 17 and which is likewise applicable to the alternative embodiments shown in FIGS. 11 to 16.

The rotary engine shown in FIG. 1 comprises a cylindrical casing 1 closed at both ends by cover members 2, 3 (FIG. 10), and defining an enclosed space. Within casing 1 a cylindrical rotor 4 is housed, and is of smaller volume than said space. Rotor 4 is eccentrically arranged within casing 1 so that its periphery enters in contact at a tangent plane with said casing 1. Rotor 4 is supported by a centric shaft 5 projecting through both cover members 2, 3 and which in FIG. 1 is schematically shown and is provided with six cams of which only one has been illustrated, more particularly cam 6, which respectively control six valves 24, 25, 28, 29, 31, 33, to which reference will be made later on.

Shaft 5 is furthermore provided with a gear 7 meshing through a pertinent pinion with an electric starter 8. Both the cams 6 as well as the starting arrangement 7, 8 are merely schematically shown and the illustration does not represent any specific structural embodiment. The same comments are applicable to the cited valves 24, 25, 28, 29, 31 and 33, and to a cam 9 schematically representing means for electric ignition circuits for spark plugs 10, 11. Cam 9 is mounted on a cam shaft 12 which is synchronized with shaft 5 so that each spark plug receives an electric discharge each four turns of the rotor 4 during normal operation of the engine.

Returning now to rotor 4, the latter slidably supports a radial blade or vane 13 resiliently urged towards outside by means of spring 14 to enter in sealing contact with the cylindrical wall of casing 1, thereby dividing the latter into a volume increasing chamber 15 and a volume decreasing chamber 16. The rotor rotates clockwise in this embodiment such as shown by arrow 17. It will thus be understood, as the rotor rotates forward with respect to the position shown in FIG. 1, the volume of chamber 15 increases and the volume of chamber 16 decreases in an interrelated manner so that the respective chambers have been identified as volume increasing chamber 15 and volume decreasing chamber 16. Both chamber 15 as well as chamber 16 have each a zone of minimum volume which are the zones adjacent the tangent plane where there is a contact between rotor 4 and casing 1. These zones are respectively identified by reference numerals 15' and 16'. To these minimum volume zones 15' and 16' several main conduits 18, 19 are connected which form part of other conduits to be described further on. Above casing 1 two chambers are shown in FIG. 1, more particularly compressed fuel mixture receiving chambers 20 and 21.

However, this representation is rather schematic and as will be appreciated in FIG. 10, these chambers 20 and 21 are arranged side by side in the same plane which obviously is a more rational arrangement and in practice it is even possible that these chambers may be integral with the casing 1, whereupon the conduits 18 and 19 and further accessories may form part of said casing. These chambers 20 and 21 are provided with the already previously mentioned spark plugs 10 and 11.

The compressed fuel mixture receiving chamber 20 is provided with a first inlet conduit 22 and a first outlet conduit 23. A first shut-off or inlet valve 24 is arranged in the first inlet conduit 22. Another shut-off valve or first outlet valve 25 is arranged in the first outlet conduit 23.

The other compressed fuel mixture receiving chamber 21 is provided with a second inlet conduit 26 and a second outlet conduit 27. A second inlet valve 28 is arranged in the second inlet conduit 26 and a second outlet valve 29 is arranged in the second outlet conduit 27.

Inlet conduits 22 and 26 are connected to main conduit 19 and outlet conduits 23 and 27 are connected to main conduit 18.

Main conduit 18 is furthermore connected to an intake conduit 30 where a shut-off or intake valve 31 is arranged. Intake conduit 30 is furthermore connected to a fuel mixture supply source (not shown) which may for instance be a carburetor system or an injection system, as will be evident to those skilled in the art.

Main conduit 19 is furthermore connected to a discharge conduit 32 including a discharge valve 33.

From what has been stated hereinabove, it is apparent that the volume increasing chamber 15 and the volume decreasing chamber 16 are sealingly spaced apart by means of radial blade 13, which is in sealing contact with the inside wall of the cylindrical casing 1. It is also necessary to provide additional sealing means which assure that the gases which are in one of the chambers will not by-pass into the other chamber through the marginal zones adjacent the cover members 2 and 3. To this end reference is now being made to FIG. 17 where the rotor 4 is provided in the zones where the base portions 34, 35 meet with the cylindrical portion 36, with pertinent annular housings 37 in which sealing rings 38, 39 are housed. These sealing rings have each an outwardly projecting portion defining a straight angle tip, so as to be capable of entering in sealing contact both with the cover members 3 and 2, respectively, as well as with the cylindrical portion of casing 1. Conveniently a resilient member 40 urges the sealing rings 38 and 39 out of their housings 37 so as to assure a good sealing contact with the stationary portions of the casing. To increase the sealing feature, second sealing rings 41, 42 are respectively housed in the base portions 35 and 34. These sealing rings 41, 42 enter through their projecting portions only in sliding contact with the cover members 3 and 2, respectively. To this end the rotor is provided in the annular housings 43 with resilient members 44 which perform the same roll as the resilient members 40. Finally, in FIG. 1 a schematic illustration of additional sealing means 45 is shown which are housed in the rotor and which operate in combination with the blade 13.

In order to be able to explain the operation of the engine, the following conventions are established with regard to the drawings: small circles identify a fuel mixture to be compressed. Once the necessary compression has been obtained, as will be explained further on, the fuel mixture will be ignited and the expanding gases are used to drive the rotor. Ellipses identify burnt or exhaust gases which have to be discharged through the discharge conduit 32.

One of the advantages which are provided by the engine of the present invention is that upon ignition taking place in one of the spaced apart chambers — chambers 20, 21 — intense cooling of only these spaced apart chambers becomes necessary.

Another advantage is that the distribution of the operative cycles during the normal operation of the engine is such that, in any pair of cycles both in the chamber 15 as well as in the chamber 16 there is either a relative low or a relative high pressure, so that the sealing means are not subject to excessive demands, as will be seen upon explaining the operation of the engine.

Assuming now that the engine of the present invention is a new engine which will start to operate for the first time or as an alternative that it is an engine which has been inoperative during a substantial time, so that the gases which may have been present in chambers 15 and 16, because of a previous operating cycle, can no longer be made use of, the engine will be started in the following manner: an electric current is supplied to electric starter 8 which will start to rotate rotor 4. It may be assumed that at the start the volume decreasing chamber 16 houses air. In this instant the discharge valve 33 is opened while the inlet valves 24 and 28, as well as the outlet valves 25 and 29, are closed. The intake valve 31 is open. During the first cycle, and one cycle has to be interpreted as corresponding to one complete turn of the blade 13, the air present in chamber 16 is discharged, through the main conduit 19 and discharge conduit 32, to stack. At the same time as the blade 13 moves forward with regard to the position shown in FIG. 1, a vacuum is being generated in the volume increasing chamber 15 which produces the necessary suction, so that a first fuel mixture 46 passes through intake conduit 13 and main conduit 18. When the blade 13, during its rotation, has passed along the main conduit 19, the discharge valve 33 is closed by means of the pertinent cam 6 and the first inlet valve 24 is opened. The first fuel mixture 46 which was housed in the volume increasing chamber 15 will become housed in the volume decreasing chamber 16 once the blade 13 has passed the line defined by the tangent plane or in other words the contact zone between the rotor 4 and the casing 1. Thus, the step as shown in FIG. 2 is reached and bearing in mind that the intake valve 31 remains open, the suctioning of a second fuel mixture 47 starts towards the volume increasing chamber 15. As may be appreciated, both the first fuel mixture 46, as well as the second fuel mixture 47, are at relative low pressure. As the rotation of the second turn continues, the first fuel mixture 46 is conveyed through the main conduit 19 and first inlet conduit 22 into the compressed fuel mixture receiving chamber 20, where the fuel mixture is being compressed at the same time as the suctioning of the second fuel mixture 47 continues entering the volume increasing chamber 15.

Once the blade 13 has passed the main conduit 19, and referring now to FIG. 3, the first inlet valve 24 is again closed and the second inlet valve 28 is opened. The moment the blade 13 has passed the main conduit 18, the intake valve 31 is closed and a spark producing electric current is sent to spark plug 11 of the compressed fuel mixture receiving chamber 20. The electric discharge or spark is schematically represented by arrow 48. At the very instant the ignition of the fuel mixture takes place, the first outlet valve 25 is opened and the power generating mixture of burnt gases 49 flows through the first outlet conduit 23 and main conduit 18 into the volume increasing chamber 15 thus driving (pushing) the blade 13 in the direction indicated by arrow 17. At the same time the second fuel mixture 47 passes to the volume decreasing chamber 16 and is sent through the main conduit 19 and second inlet conduit 26 to the compressed fuel mixture receiving chamber 21.

In the fourth turn, and directing now the attention in first instance to FIG. 4, the mixture of burnt gases 49 has passed into the volume decreasing chamber 16 and as soon as the blade 13 has passed the tangent plane, the second inlet valve 28 is closed, whereby the second fuel mixture 47 is housed in a compressed state in the compressed fuel mixture receiving chamber 21.

In the cycle corresponding to FIG. 3, which is already a cycle corresponding to the normal operation of the engine, the pressure in the volume increasing chamber 15 is a high one, because said chamber 15 houses now the power generating gases 49. At the same time the gases of the second fuel mixture 47 generate a counter pressure, because they have to be compressed in order to enter the compressed fuel mixture receiving chamber 21, bearing in mind that the latter defines a small volume.

Attention is now directed to FIG. 5, which corresponds to the fourth turn in the starting cycle, but where the blade 13 has already moved through part of its stroke by having passed along the main conduit 18 and where after having passed said main conduit, the intake valve 31 is opened while the discharge valve 33 was already opened at the very beginning of this cycle, such as shown in FIG. 4. During this cycle or turn of the rotor 4, the burnt gases 49 are discharged and which gases are now in the volume decreasing chamber 16. These gases are discharged through the main conduit 19 and discharge valve 33, at the same time as a third charge of fuel mixture 50 is suctioned through intake conduit 30 and main conduit 18 to enter the volume increasing chamber 15. When this cycle is concluded, the engine has actually entered its normal performance. The operation of the engine during its normal performance will now be described.

Bearing in mind that the engine of the embodiment which is now being described has only one volume increasing chamber and one volume decreasing chamber, the rotor has to rotate through four complete turns in order to fulfil a complete performance cycle. During these four turns each of the spark plugs has to produce one ignition spark.

Referring now to FIG. 6, the instant the blade 13 has passed through the tangent plane, the discharge valve 33 is closed and once the blade 13 has passed the main conduit 18, the intake valve 31 is closed and the second outlet valve 29 is opened and an electric discharge current 51 is sent to spark plug 10. Thus, a power generating mixture of burnt gases 52 is produced which passes through the second outlet conduit 27, main conduit 18 to enter the volume increasing chamber 15, while the third fuel mixture has passed to the volume decreasing chamber 16. Furthermore, the instant the second outlet valve 29 is opened, the first inlet valve 24 is likewise opened and the third charge of fuel mixture 50 is compressed into the compressed fuel mixture receiving chamber 20.

During the second turn of rotor 4, when operating under normal performance, the discharge valve 33 is opened, the first inlet valve 24 and the second outlet valve 29 are closed and the intake valve 31 is opened. The burnt gases 52 are now housed in the volume decreasing chamber 16 and a fourth charge of fuel mixture 53 is suctioned through the opened intake valve 31, while the burnt mixture 52 is discharged through the discharge valve 33.

During the third turn (FIG. 8), the discharge valve 33 is again closed, the second inlet valve 28 and first outlet valve 25 are opened and the intake valve 31 is closed. An electric discharge current 54 is sent to spark plug 11 to ignite the compressed fuel mixture housed in the third compressed fuel mixture receiving chamber 20, whereby the burnt gases 55 are formed, at the same time as the fourth charge of fuel mixture 53 is sent to the fourth compressed fuel mixture receiving chamber 21.

Finally, the fourth turn of the engine running under normal performance, is shown in FIG. 9, where again the discharge valve 33 is opened, the second inlet valve 28 is closed and the intake valve 31 is opened. Thus, the burnt gases 55 which are now housed in the volume decreasing chamber 16 are discharged through discharge valve 33, while the fifth charge of fuel mixture 56 moves into the volume decreasing chamber 15.

The next turn of the normal performance of the engine forms part of a new complete cycle identical to the one described in relation to FIG. 6 to continue then the different turns, as described in relationship with FIGS. 6 to 9. If desired, several of these engines may be arranged in tandem, whereupon it is advisable to dephase the different cycles in order to obtain a more compensated performance.

Instead of providing a series of these engines in tandem, it is also possible to provide by way of alternative, another structural embodiment to decrease the number of engines. For instance, the embodiment as shown in FIGS. 11 and 12 may be used, where a single casing 101 provides, so to say, for two prime mover units. To this end, the rotor 140 establishes tangent planes in two diametrically opposed zones in the casing 101 and is provided with two diametrically opposite blades 113 and 113′, dividing the pertinent zones of the casing into the volume increasing chambers 115, 115′ and the volume decreasing chambers 116 and 116′. Each of these chambers 115, 116; 115′, 116′, are connected to pertinent compressed fuel mixture receiving chambers 120, 121; 120′, 121′. As is apparent from the foregoing, the same reference numerals have been used as those in connection with FIG. 1, but preceded by the prefix "100." Accordingly, it is considered unnecessary to describe this arrangement in further details, since both the structure as well as the operation will be evident, bearing in mind the foregoing explanations. Both in the embodiment corresponding to FIG. 1 to 10 and 17, as well as in the embodiment described in relationship with FIGS. 11 and 12, the rotor 4, 104, rotates about a central shaft 5, 105. On the other hand, in the embodiments corresponding to FIGS. 13 to 16, which show two further alternatives, the rotors 204 and 304 rotate about an eccentric shaft 205, 305, respectively.

In the embodiment shown in FIGS. 13 and 14, the same means and members as those described in connection with FIG. 1 bear the same reference numerals, but preceded by the prefix "200." The casing 201 is a cylindrical casing of the same type as casing 1, but the rotor 204 does not require a blade, because of its eccentric arrangement — due to shaft 205 — a portion of its surface and more particularly the sealing portion 257 is constantly in contact with casing 201. Furthermore the casing slidably supports a blade 259 which is in sealing contact with the periphery of the rotor 204. Said blade 259 is resiliently urged into sealing contact with said periphery by means of a spring 214, similarly as vane 13 and spring 14. Thus, blade 259 is adapted to divide the inside of the casing 201 into a volume increasing chamber and a volume decreasing chamber similarly as blade 13 in the embodiment of FIG. 1. The sealing portion 257 may consist of an insert of softer material than that of casing 201 and which may be replaced upon becoming worn out. Conveniently a series of resilient parallel plate members forming a substantially rectangular parallelepipedic block may be used.

In order to avoid that too many vibrations are generated upon the eccentric rotor 204 starts to rotate, the portion of the rotor having the larger mass has perforations 258 to reduce that mass. As to the operation, the different steps or cycles are the same as those described in relationship with FIGS. 1 to 9, and therefore repetition becomes unnecessary.

Finally, with regard to the embodiment shown in FIGS. 15 and 16, where the same means are used as those in the previously explained embodiments but are identified with reference numerals preceded by the prefix "300," said embodiment is a combination of the embodiments and advantages corresponding to those disclosed in relationship with FIGS. 12 and 14.

In fact, within casing 301 an eccentric rotor 304 is housed provided with a sealing member 357 and furthermore the casing slidably supports two diametrically opposed blades 359, 360 which are in sealing contact with the periphery of the rotor 304, thereby dividing the casing 301 into two prime mover units, in a similar manner as in the embodiment of FIG. 12, but with the additional advantage that the blades 359, 360 do not rotate with the rotor, while in the embodiment of FIG. 12, blades 113 and 113′ do rotate with the rotor 104. In this embodiment the principle of operation is the same as those of the previously described embodiments and therefore repetition becomes unnecessary.

Although several embodiments of the invention have been illustrated and described in detail, it is to be expressly understood that the invention is not limited thereto. Various changes can be made in the design and arrangement of the parts without departing from the spirit and scope of the invention as the same will now be understood by those skilled in the art.

I claim:

1. In a rotary engine, a casing defining an enclosed space, a rotor of smaller volume than said space, said rotor being rotatably housed in said space, said rotor having a periphery which enters in contact at, at least one tangent plane with said casing, at least one sealing means in relationship with said rotor and casing, said sealing means dividing said space into at least one volume increasing chamber and one volume decreasing chamber, the improvement of at least two compressed fuel mixture receiving chambers outside said space, conduit means including controllable shut-off valves connecting said compressed fuel mixture receiving chambers to said volume increasing and decreasing chambers adjacent said tangent plane, a fuel mixture inlet conduit having controllable shut-off valve means and an exhaust gas outlet conduit having controllable shut-off valve means, said fuel mixture inlet conduit being connected to said volume increasing chamber adjacent said tangent plane, said exhaust gas outlet conduit being connected to said volume decreasing chamber adjacent said tangent plane, each compressed fuel mixture receiving chamber is provided with fuel ignition means, and timed control means respectively connected to said ignition means and said valve means for exciting said ignition means and for opening and closing said valve means in timed relationship, so as to allow compression and expansion into and from said compressed fuel mixture receiving chambers in an alternate manner.

2. The engine of claim 1, comprising a shaft passing through the center of said rotor, said sealing means is at least one radial blade slidably supported by said rotor and resiliently urged to enter in contact with said casing, thereby dividing said casing into said volume increasing chamber and said volume decreasing chamber.

3. The engine of claim 1, comprising a shaft, said rotor is eccentrically mounted on said shaft and is in substantial sealing contact at said tangent plane with said casing.

4. The engine of claim 3, wherein said rotor has perforations in the zone of largest mass to balance the existing masses around said shaft.

5. The engine of claim 3, wherein the portion of the rotor which is in sealing contact with said casing consists of a sealing insert mounted in said rotor.

6. The engine of claim 1, wherein said casing slidably supports at least one blade resiliently urged towards the rotor with which it is in sealing contact, thereby dividing the space formed between the rotor and the casing into said volume increasing chamber and said volume decreasing chamber.

7. The engine of claim 1, wherein said casing has a cylindrical wall and a pair of cover members, said rotor has a cylindrical portion and a pair of base portions, annular housings at the confluence of said cylindrical portion with said base portions, sealing rings housed in said housings, resiliently projecting out of said housings and ending into straight angle tips entering in simultaneous sealing contact with said cylindrical wall and one of said cover members.

8. The engine of claim 7, wherein each base portion of said rotor resiliently supports a second sealing ring, said second sealing rings projecting out of said base portions and are in sliding sealing contact with one of said pair of cover members of said casing.

9. The engine of claim 1, wherein one of said two compressed fuel mixture receiving chambers is connected to a first inlet conduit and a first outlet conduit, a first inlet valve in said first inlet conduit, a first outlet valve in said first outlet conduit, the other of said two compressed fuel mixture receiving chambers is connected to a second inlet conduit and a second outlet conduit, a second inlet valve in said second inlet conduit, a second outlet valve in said second outlet conduit, a first main conduit connected to said volume increasing chamber adjacent said tangent plane, a second main conduit connected to said volume decreasing chamber adjacent said tangent plane, said fuel mixture inlet conduit and said first and second inlet conduits being connected to said first main conduit, said exhaust gas outlet conduit and said first and second outlet conduits being connected to said second main conduit.

10. The engine of claim 1, wherein each compressed fuel mixture receiving chamber is provided with at least one spark plug.

* * * * *